(12) United States Patent
Kim et al.

(10) Patent No.: US 10,303,981 B1
(45) Date of Patent: May 28, 2019

(54) LEARNING METHOD AND TESTING METHOD FOR R-CNN BASED OBJECT DETECTOR, AND LEARNING DEVICE AND TESTING DEVICE USING THE SAME

(71) Applicant: StradVision, Inc., Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongbuk (KR)

( * ) Notice: Subject to any disclaimer, the term of this patent is extended or adjusted under 35 U.S.C. 154(b) by 0 days.

(21) Appl. No.: 16/151,693

(22) Filed: Oct. 4, 2018

(51) Int. Cl.
    *G06K 9/62* (2006.01)
    *G06K 9/32* (2006.01)
    *G06N 3/08* (2006.01)

(52) U.S. Cl.
    CPC ......... *G06K 9/6262* (2013.01); *G06K 9/3241* (2013.01); *G06K 9/6201* (2013.01); *G06K 9/628* (2013.01); *G06K 9/6232* (2013.01); *G06K 9/6257* (2013.01); *G06K 9/6259* (2013.01); *G06N 3/08* (2013.01)

(58) Field of Classification Search
    None
    See application file for complete search history.

(56) References Cited

U.S. PATENT DOCUMENTS

| | | | |
|---|---|---|---|
| 2017/0169315 A1* | 6/2017 | Vaca Castano | G06K 9/3233 |
| 2017/0206431 A1* | 7/2017 | Sun | G06N 3/084 |

* cited by examiner

*Primary Examiner* — Matthew C Bella
*Assistant Examiner* — Brian D Shin
(74) *Attorney, Agent, or Firm* — Husch Blackwell LLP

(57) ABSTRACT

A method for learning parameters of an object detector based on R-CNN is provided. The method includes steps of: a learning device (a) if training image is acquired, instructing (i) convolutional layers to generate feature maps by applying convolution operations to the training image, (ii) an RPN to output ROI regression information and matching information (iii) a proposal layer to output ROI candidates as ROI proposals by referring to the ROI regression information and the matching information, and (iv) a proposal-selecting layer to output the ROI proposals by referring to the training image; (b) instructing pooling layers to generate feature vectors by pooling regions in the feature map, and instructing FC layers to generate object regression information and object class information; and (c) instructing first loss layers to calculate and backpropagate object class loss and object regression loss, to thereby learn parameters of the FC layers and the convolutional layers.

28 Claims, 6 Drawing Sheets

LEARNING METHOD AND TESTING METHOD FOR R-CNN BASED OBJECT DETECTOR, AND LEARNING DEVICE AND TESTING DEVICE USING THE SAME

FIELD OF THE INVENTION

The present invention relates to a method for learning parameters of an object detector based on an R-CNN; and more particularly, to the method for learning parameters of the object detector based on the R-CNN, including steps of: (a) if at least one training image is acquired, (i) instructing one or more convolutional layers to generate one or more feature maps by applying one or more convolution operations to the training image, (ii) instructing an RPN to output pieces of ROI regression information and pieces of matching information wherein the ROI regression information includes regression information on each of ROI candidates corresponding to each of candidate regions estimated as including at least one object in a specific feature map among the feature maps, and the matching information includes information on one selected from class groups which respectively include their corresponding one or more classes, wherein the one or more classes are determined by referring to information on the at least one object within said each of ROI candidates, (iii) instructing a proposal layer to output one or more specific ROI candidates, which have high probabilities of being one or more ROIs, among the ROI candidates, as one or more ROI proposals by referring to the ROI regression information and the matching information, and (iv) instructing a proposal-selecting layer to output each of the ROI proposals for each of said pieces of matching information by referring to the training image; (b) instructing each of pooling layers corresponding to each of said pieces of matching information to generate each of feature vectors by pooling each region in the specific feature map corresponding to said each of the ROI proposals for each of said pieces of matching information, and instructing each of FC layers corresponding to said each of the pooling layers to generate object regression information and object class information corresponding to said each of the ROI proposals for each of said pieces of matching information by referring to said each of the feature vectors; and (c) instructing each of first loss layers corresponding to said each of the FC layers to calculate each object class loss and each object regression loss by referring to the object class information for each of said pieces of matching information, the object regression information for each of said pieces of matching information, and their corresponding first GTs, and to backpropagate said each object class loss and said each object regression loss, to thereby learn parameters of said each of the FC layers and the convolutional layers, and a testing method, a learning device, and a testing device using the same.

BACKGROUND OF THE INVENTION

Deep learning is a technology used to cluster or classify objects or data. For example, computers cannot distinguish dogs and cats from photographs alone. But a human can easily distinguish those two. To this end, a method called "machine learning" was devised. It is a technique to allow a computer to classify similar things among lots of data inputted into the computer. When a photo of an animal similar to a dog is inputted, the computer will classify it as a dog photo.

There have already been many machine learning algorithms to classify data. For example, a decision tree, a Bayesian network, a support vector machine (SVM), an artificial neural network, etc. have been developed. The deep learning is a descendant of the artificial neural network.

Deep Convolution Neural Networks (Deep CNNs) are the heart of the remarkable development in deep learning. CNNs have already been used in the 90's to solve the problem of character recognition, but their use has become as widespread as it is now thanks to recent research. These deep CNNs won the 2012 ImageNet image classification tournament, crushing other competitors. Then, the convolution neural network became a very useful tool in the field of the machine learning.

Recently, an object detector based on an R-CNN for detection of an object in an image has become popular.

Such the object detector based on the R-CNN is learned using backpropagation by referring to loss values, and its performance depends on its learning result.

However, data sets are hard to come by which includes every object of interest to be detected by the object detector.

As one example, when developing the object detector for six kinds of objects like pedestrians, riders, cars, traffic signs, traffic lights, and animals in an image of a road seen from a vehicle in operation, data sets comprised of training images including all of the six kinds of objects are hard to prepare.

Therefore, a conventional object detector based on the R-CNN, if provided with each of the data sets for each of class groups into which the objects of interest are classified, creates each of R-CNN networks for said each of the data sets and learns the parameters of the R-CNN networks. Herein, the conventional object detector includes the R-CNN networks each of which is separately learned.

That is, by referring to FIG. 1, to detect the six kinds of objects like pedestrians, riders, cars, traffic signs, traffic lights, and animals, as shown in (A), at least one data set for pedestrians, riders, and cars is prepared and used for learning parameters of an R-CNN1, as shown in (B), at least one data set for traffic signs and traffic lights is prepared and used for learning parameters of an R-CNN2, and as shown in (C), at least one data set for animals is prepared and used for learning parameters of an R-CNN3.

Thereafter, the object detector based on the R-CNN is configured to include the R-CNN1, the R-CNN2, and the R-CNN3.

However, this conventional object detector based on the R-CNN includes different multiple deep learning networks corresponding to the number of data sets for learning, therefore, in a real-world test, the conventional object detector shows a problem that execution time increases in proportion to the number of its deep learning networks, compared to a detector including just one deep learning network.

SUMMARY OF THE INVENTION

It is an object of the present invention to solve all the aforementioned problems.

It is another object of the present invention to allow learning parameters of a deep learning network for different multiple data sets.

It is still another object of the present invention to reduce execution time of an object detector based on an R-CNN learned by using the different multiple data sets.

It is still yet another object of the present invention to provide the object detector based on the R-CNN using the deep learning network learned by using the different multiple data sets.

In accordance with one aspect of the present invention, there is provided a method for learning parameters of an object detector based on an R-CNN, including steps of: (a) if at least one training image is acquired, a learning device (i) instructing one or more convolutional layers to generate one or more feature maps by applying one or more convolution operations to the training image, (ii) instructing an RPN to output pieces of ROI regression information and pieces of matching information wherein the ROI regression information includes regression information on each of ROI candidates corresponding to each of candidate regions estimated as including at least one object in a specific feature map among the feature maps, and the matching information includes information on one selected from class groups which respectively include their corresponding one or more classes, wherein the one or more classes are determined by referring to information on the at least one object within said each of ROI candidates, (iii) instructing a proposal layer to output one or more specific ROI candidates, which have high probabilities of being one or more ROIs, among the ROI candidates, as one or more ROI proposals by referring to the ROI regression information and the matching information, and (iv) instructing a proposal-selecting layer to output each of the ROI proposals for each of said pieces of matching information by referring to the training image; (b) the learning device instructing each of pooling layers corresponding to each of said pieces of matching information to generate each of feature vectors by pooling each region in the specific feature map corresponding to said each of the ROI proposals for each of said pieces of matching information, and instructing each of FC layers corresponding to said each of the pooling layers to generate object regression information and object class information corresponding to said each of the ROI proposals for each of said pieces of matching information by referring to said each of the feature vectors; and (c) the learning device instructing each of first loss layers corresponding to said each of the FC layers to calculate each object class loss and each object regression loss by referring to the object class information for each of said pieces of matching information, the object regression information for each of said pieces of matching information, and their corresponding first GTs, and to backpropagate said each object class loss and said each object regression loss, to thereby learn parameters of said each of the FC layers and the convolutional layers.

As one example, the learning device instructs a second loss layer corresponding to the RPN to learn parameters of the RPN by backpropagating one or more second losses acquired by referring to the ROI regression information, the matching information, and at least one second GT.

As one example, if the training image is determined as including first objects and second objects corresponding respectively to first matching information and second matching information among the matching information, at the step of (a), the learning device instructs the proposal-selecting layer to output first ROI proposals and second ROI proposals corresponding respectively to the first matching information and the second matching information, at the step of (b), the learning device (i) instructs a first pooling layer corresponding to the first matching information to generate a first feature vector by pooling regions, in the specific feature map, corresponding to the first ROI proposals, and instructs a first FC layer corresponding to the first pooling layer to output first object class information and first object regression information of the first objects by using the first feature vector, and (ii) instructs a second pooling layer corresponding to the second matching information to generate a second feature vector by pooling regions, in the feature map, corresponding to the second ROI proposal, and instructs a second FC layer corresponding to the second pooling layer to output second object class information and second object regression information of the second objects by using the second feature vector, and at the step of (c), the learning device (i) instructs a 1-1 loss layer among the first loss layers corresponding to the first FC layer to calculate at least one first object class loss and at least one first object regression loss by referring to the first object class information, the first object regression information, and at least one 1-1 GT among the first GTs, and to backpropagate the first object class loss and the first object regression loss, to thereby learn parameters of the first FC layers and the convolutional layers, and (ii) instructs a 1-2 loss layer among the first loss layers corresponding to the second FC layer to calculate at least one second object class loss and at least one second object regression loss by referring to the second object class information, the second object regression information, and at least one 1-2 GT among the first GTs, and to backpropagate the second object class loss and the second object regression loss, to thereby learn parameters of the second FC layers and the convolutional layers.

As one example, before the step of (a), the learning device acquires the training images as each batch data wherein the training images include each of objects corresponding to each of the class groups.

As one example, said each batch data includes same number of the training images corresponding to each of the class groups.

As one example, a specific training image among the training images in the batch data includes objects only with classes in a specific class group among the class groups, or includes objects with classes in two or more of the class groups.

As one example, at the step of (a), the learning device instructs the RPN to learn parameters of the RPN for all the training images in the batch data.

As one example, the at least one second GT includes at least one second positive GT of positive samples tagged as objects with their corresponding class groups, and at least one second negative GT of negative samples not tagged as the objects with their corresponding class groups, for each of the training images in the batch data.

As one example, at the step of (c), the learning device instructs each of the first loss layers to calculate the object class loss and the object regression loss, by using at least one first positive GT of positive samples tagged as objects corresponding to the matching information and at least one first negative GT of negative samples not tagged as the objects corresponding to the matching information, for each of the training images in the batch data.

As one example, the learning device instructs the proposal-selecting layer to acquire said each of the first GTs corresponding to said each of the ROI proposals for each of said pieces of the matching information by referring to the training images, to thereby input each of the first GTs into each of the first loss layers corresponding to each of said pieces of the matching information.

In accordance with another aspect of the present invention, there is provided a method for testing an object detector based on an R-CNN, including steps of: (a) on condition that a learning device has instructed (i) one or more convolutional layers to generate one or more feature maps for training by applying one or more convolution operations to at least one training image, (ii) an RPN to output pieces of ROI regression information for training and pieces of matching information for training where the ROI regression information for training includes regression information on each of ROI candidates for training corresponding to each of candidate regions estimated as including at least one object for training in a specific feature map for training among the feature maps for training, and the matching information for training includes information on one selected from class groups which respectively include their corresponding one or more classes, wherein the classes are determined by referring to information on the at least one object for training within said each of ROI candidates for training, (iii) a proposal layer to output one or more specific ROI candidates for training, which have high probabilities of being one or more ROIs, among the ROI candidates for training, as one or more ROI proposals for training by referring to the ROI regression information for training and the matching information for training, (iv) a proposal-selecting layer to output each of the ROI proposals for training for each of said pieces of matching information for training by referring to the training image, (v) each of pooling layers to each of said pieces of matching information for training to generate each of feature vectors for training by pooling each region in the specific feature map for training corresponding to said each of the ROI proposals for training for each of said pieces of matching information for training, and each of FC layers corresponding to said each of the pooling layers to generate object regression information for training and object class information for training corresponding to said each of the ROI proposals for training for each of said pieces of matching information for training by referring to said each of the feature vectors for training, and (vi) each of first loss layers corresponding to said each of the FC layers to calculate each object class loss and each object regression loss by referring to the object class information for training, the object regression information for training, and each of their corresponding first GTs, to thereby backpropagate said each object class loss and said each object regression loss to learn parameters of said each of the FC layers and the convolutional layers, then, if at least one test image is inputted, a testing device instructing the convolutional layers to apply the convolution operations to the test image, to thereby output one or more feature maps for testing; (b) the testing device instructing (i) the RPN to output pieces of ROI regression information for testing and pieces of matching information for testing wherein the ROI regression information for testing includes regression information on each of ROI candidates corresponding to each of candidate regions estimated as including at least one object for testing in a specific feature map among the feature maps for testing, and the matching information for testing includes information on one selected from class groups which respectively include their corresponding one or more classes, wherein the classes are determined by referring to information on the at least one object for testing within said each of ROI candidates, (ii) the proposal layer to output one or more specific ROI candidates, which have high probabilities of being one or more ROIs, among the ROI candidates, as one or more ROI proposals for testing for each of said pieces of matching information for testing by referring to the ROI regression information for testing and the matching information for testing; and (c) the testing device instructing each of pooling layers corresponding to each of said pieces of matching information for testing to generate each of feature vectors for testing by pooling each region in the specific feature map for testing corresponding to said each of the ROI proposals for testing for each of said pieces of matching information for testing, and instructing each of FC layers corresponding to said each of the pooling layers to generate object regression information for testing and object class information for testing corresponding to said each of the ROI proposals for testing for each of said pieces of matching information for testing by referring to said each of the feature vectors for testing.

As one example, at the step of (a), parameters of the RPN have been learned by backpropagating one or more second losses calculated by a second loss layer according to instruction of the learning device, and wherein the second losses have been acquired by referring to the ROI regression information for training, the matching information for training, and at least one second GT.

As one example, if the test image is determined as including first objects for testing and second objects for testing corresponding respectively to first matching information for testing and second matching information for testing among the matching information for testing, at the step of (b), the testing device instructs the proposal layer to output first ROI proposals for testing and second ROI proposals for testing corresponding respectively to the first matching information for testing and the second matching information for testing, at the step of (c), the testing device (i) instructs a first pooling layer corresponding to the first matching information for testing to generate a first feature vector for testing by pooling regions, in the specific feature map for testing, corresponding to the first ROI proposals for testing, and instructs a first FC layer corresponding to the first pooling layer to output first object class information for testing and first object regression information for testing of the first objects for testing by using the first feature vector for testing, and (ii) instructs a second pooling layer corresponding to the second matching information for testing to generate a second feature vector for testing by pooling regions, in the specific feature map for testing, corresponding to the second ROI proposal for testing, and instructs a second FC layer corresponding to the second pooling layer to output second object class information for testing and second object regression information for testing of the second objects for testing by using the second feature vector for testing.

As one example, the method for testing further includes a step of: (d) the testing device instructing its outputting layer to display object information corresponding to the objects for testing on the test image, by referring to the ROI proposals for testing for each piece of the matching information for testing outputted from the proposal layer, and the object regression information for testing and the object class information for testing outputted from said each of FC layers.

In accordance with still another aspect of the present invention, there is provided a learning device for learning parameters of an object detector based on an R-CNN, including: a communication part for acquiring at least one training image; and a processor for performing processes of (I) instructing one or more convolutional layers to generate one or more feature maps by applying one or more convolution operations to the training image, (II) instructing an RPN to output pieces of ROI regression information and pieces of matching information wherein the ROI regression information includes regression information on each of ROI candidates corresponding to each of candidate regions estimated as including at least one object in a specific feature map among the feature maps, and the matching information includes information on one selected from class groups which respectively include their corresponding one or more classes, wherein the one or more classes are determined by referring to information on the at least one object within said each of ROI candidates, (III) instructing a proposal layer to output one or more specific ROI candidates, which have high probabilities of being one or more ROIs, among the ROI candidates, as one or more ROI proposals by referring to the ROI regression information and the matching information, and (IV) instructing a proposal-selecting layer to output each of the ROI proposals for each of said pieces of matching information by referring to the training image, (V) instructing each of pooling layers corresponding to each of said pieces of matching information to generate each of feature vectors by pooling each region in the specific feature map corresponding to said each of the ROI proposals for each of said pieces of matching information, and instructing each of FC layers corresponding to said each of the pooling layers to generate object regression information and object class information corresponding to said each of the ROI proposals for each of said pieces of matching information by referring to said each of the feature vectors, and (VI) instructing each of first loss layers corresponding to said each of the FC layers to calculate each object class loss and each object regression loss by referring to the object class information for each of said pieces of matching information, the object regression information for each of said pieces of matching information, and their corresponding first GTs, and to backpropagate said each object class loss and said each object regression loss, to thereby learn parameters of said each of the FC layers and the convolutional layers.

As one example, the processor instructs a second loss layer corresponding to the RPN to learn parameters of the RPN by backpropagating one or more second losses acquired by referring to the ROI regression information, the matching information, and at least one second GT.

As one example, if the training image is determined as including first objects and second objects corresponding respectively to first matching information and second matching information among the matching information, at the process of (IV), the processor instructs the proposal-selecting layer to output first ROI proposals and second ROI proposals corresponding respectively to the first matching information and the second matching information, at the process of (V), the processor (i) instructs a first pooling layer corresponding to the first matching information to generate a first feature vector by pooling regions, in the specific feature map, corresponding to the first ROI proposals, and instructs a first FC layer corresponding to the first pooling layer to output first object class information and first object regression information of the first objects by using the first feature vector, and (ii) instructs a second pooling layer corresponding to the second matching information to generate a second feature vector by pooling regions, in the feature map, corresponding to the second ROI proposal, and instructs a second FC layer corresponding to the second pooling layer to output second object class information and second object regression information of the second objects by using the second feature vector, and at the process of (VI), the processor (i) instructs a 1-1 loss layer among the first loss layers corresponding to the first FC layer to calculate at least one first object class loss and at least one first object regression loss by referring to the first object class information, the first object regression information, and at least one 1-1 GT among the first GTs, and to backpropagate the first object class loss and the first object regression loss, to thereby learn parameters of the first FC layers and the convolutional layers, and (ii) instructs a 1-2 loss layer among the first loss layers corresponding to the second FC layer to calculate at least one second object class loss and at least one second object regression loss by referring to the second object class information, the second object regression information, and at least one 1-2 GT among the first GTs, and to backpropagate the second object class loss and the second object regression loss, to thereby learn parameters of the second FC layers and the convolutional layers.

As one example, the communication part acquires the training images as each batch data wherein the training images include each of objects corresponding to each of the class groups.

As one example, said each batch data includes same number of the training images corresponding to each of the class groups.

As one example, a specific training image among the training images in the batch data includes objects only with classes in a specific class group among the class groups, or includes objects with classes in two or more of the class groups.

As one example, at the process of (II), the processor instructs the RPN to learn parameters of the RPN for all the training images in the batch data.

As one example, the at least one second GT includes at least one second positive GT of positive samples tagged as objects with their corresponding class groups, and at least one second negative GT of negative samples not tagged as the objects with their corresponding class groups, for each of the training images in the batch data.

As one example, at the process of (VI), the processor instructs each of the first loss layers to calculate the object class loss and the object regression loss, by using at least one first positive GT of positive samples tagged as objects corresponding to the matching information and at least one first negative GT of negative samples not tagged as the objects corresponding to the matching information, for each of the training images in the batch data.

As one example, the processor instructs the proposal-selecting layer to acquire said each of the first GTs corresponding to said each of the ROI proposals for each of said pieces of the matching information by referring to the training images, to thereby input each of the first GTs into each of the first loss layers corresponding to each of said pieces of the matching information.

In accordance with still yet another aspect of the present invention, there is provided a testing device for testing an object detector based on an R-CNN, including: a communication part for acquiring at least one test image, on condition that a learning device has instructed (i) one or more convolutional layers to generate one or more feature maps for training by applying one or more convolution operations to at least one training image, (ii) an RPN to output pieces of ROI regression information for training and pieces of matching information for training where the ROI regression information for training includes regression information on each of ROI candidates for training corresponding to each of candidate regions estimated as including at least one object for training in a specific feature map for training among the feature maps for training, and the matching information for training includes information on one selected from class groups which respectively include their corresponding one or more classes, wherein the classes are determined by referring to information on the at least one object for training within said each of ROI candidates for training, (iii) a proposal layer to output one or more specific ROI candidates for training, which have high probabilities of being one or more ROIs, among the ROI candidates for training, as one or more ROI proposals for training by referring to the ROI regression information for training and the matching information for training, (iv) a proposal-selecting layer to output each of the ROI proposals for training for each of said pieces of matching information for training by referring to the training image, (v) each of pooling layers to each of said pieces of matching information for training to generate each of feature vectors for training by pooling each region in the specific feature map for training corresponding to said each of the ROI proposals for training for each of said pieces of matching information for training, and each of FC layers corresponding to said each of the pooling layers to generate object regression information for training and object class information for training corresponding to said each of the ROI proposals for training for each of said pieces of matching information for training by referring to said each of the feature vectors for training, and (vi) each of first loss layers corresponding to said each of the FC layers to calculate each object class loss and each object regression loss by referring to the object class information for training, the object regression information for training, and each of their corresponding first GTs, to thereby backpropagate said each object class loss and said each object regression loss to learn parameters of said each of the FC layers and the convolutional layers; and a processor performing processes of (I) instructing the convolutional layers to apply the convolution operations to the test image, to thereby output one or more feature maps for testing, (II) instructing (i) the RPN to output pieces of ROI regression information for testing and pieces of matching information for testing wherein the ROI regression information for testing includes regression information on each of ROI candidates corresponding to each of candidate regions estimated as including at least one object for testing in a specific feature map among the feature maps for testing, and the matching information for testing includes information on one selected from class groups which respectively include their corresponding one or more classes, wherein the classes are determined by referring to information on the at least one object for testing within said each of ROI candidates, (ii) the proposal layer to output one or more specific ROI candidates, which have high probabilities of being one or more ROIs, among the ROI candidates, as one or more ROI proposals for testing for each of said pieces of matching information for testing by referring to the ROI regression information for testing and the matching information for testing, and (III) instructing each of pooling layers corresponding to each of said pieces of matching information for testing to generate each of feature vectors for testing by pooling each region in the specific feature map for testing corresponding to said each of the ROI proposals for testing for each of said pieces of matching information for testing, and instructing each of FC layers corresponding to said each of the pooling layers to generate object regression information for testing and object class information for testing corresponding to said each of the ROI proposals for testing for each of said pieces of matching information for testing by referring to said each of the feature vectors for testing.

As one example, before the process of (I), parameters of the RPN have been learned by backpropagating one or more second losses calculated by a second loss layer according to instruction of the learning device, and wherein the second losses have been acquired by referring to the ROI regression information for training, the matching information for training, and at least one second GT.

As one example, if the test image is determined as including first objects for testing and second objects for testing corresponding respectively to first matching information for testing and second matching information for testing among the matching information for testing, at the process of (II), the processor instructs the proposal layer to output first ROI proposals for testing and second ROI proposals for testing corresponding respectively to the first matching information for testing and the second matching information for testing, and at the process of (III), the processor (i) instructs a first pooling layer corresponding to the first matching information for testing to generate a first feature vector for testing by pooling regions, in the specific feature map for testing, corresponding to the first ROI proposals for testing, and instructs a first FC layer corresponding to the first pooling layer to output first object class information for testing and first object regression information for testing of the first objects for testing by using the first feature vector for testing, and (ii) instructs a second pooling layer corresponding to the second matching information for testing to generate a second feature vector for testing by pooling regions, in the specific feature map for testing, corresponding to the second ROI proposal for testing, and instructs a second FC layer corresponding to the second pooling layer to output second object class information for testing and second object regression information for testing of the second objects for testing by using the second feature vector for testing.

As one example, the processor further performs a process of instructing its outputting layer to display object information corresponding to the objects for testing on the test image, by referring to the ROI proposals for testing for each piece of the matching information for testing outputted from the proposal layer, and the object regression information for testing and the object class information for testing outputted from said each of FC layers.

In addition, recordable media that are readable by a computer for storing a computer program to execute the method of the present invention is further provided.

BRIEF DESCRIPTION OF THE DRAWINGS

The following drawings to be used to explain example embodiments of the present invention are only part of example embodiments of the present invention and other drawings can be obtained based on the drawings by those skilled in the art of the present invention without inventive work.

DETAILED DESCRIPTION OF THE PREFERRED EMBODIMENTS

Figure 1:
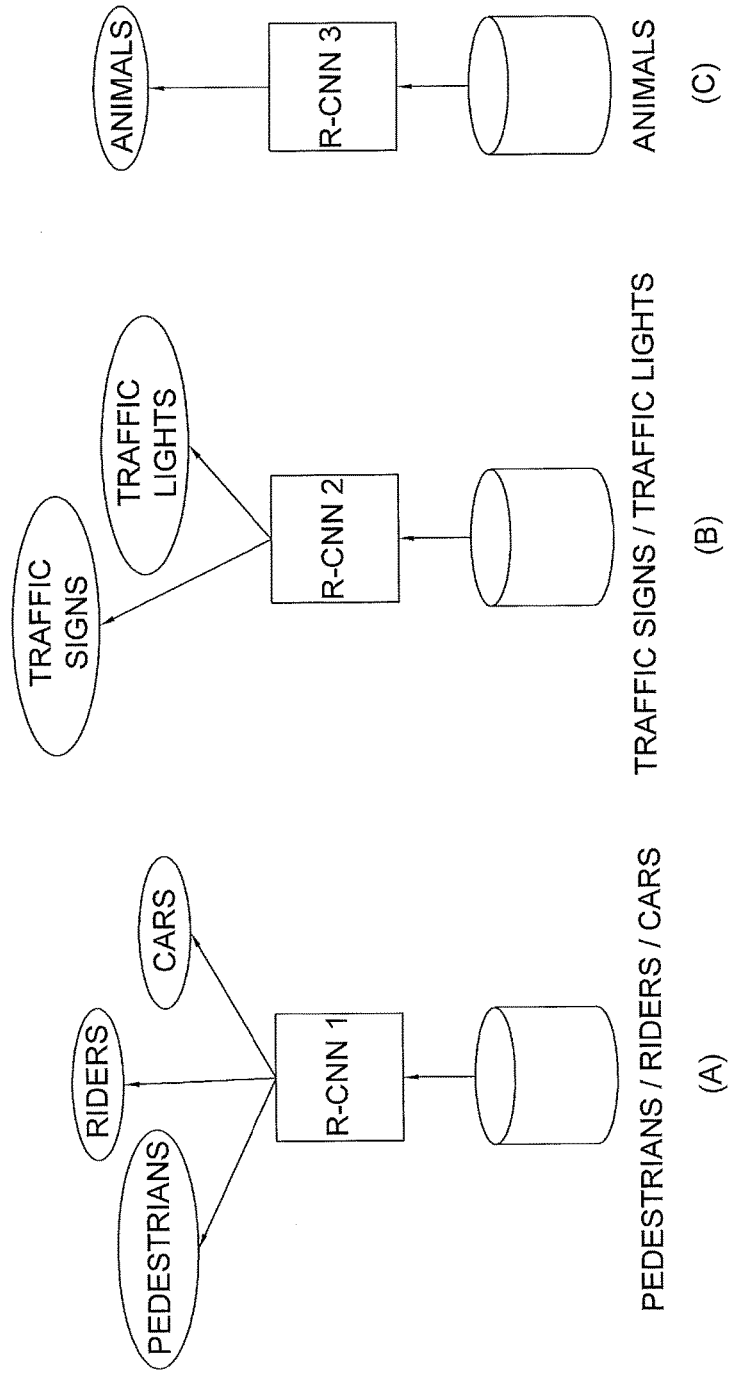
FIG. 1 is a drawing schematically illustrating each process of learning each of class groups according to a conventional object detector based on an R-CNN.

Detailed explanation on the present invention to be made below refer to attached drawings and diagrams illustrated as specific embodiment examples under which the present invention may be implemented to make clear of purposes, technical solutions, and advantages of the present invention. These embodiments are described in sufficient detail to enable those skilled in the art to practice the invention.

Besides, in the detailed description and claims of the present invention, a term "include" and its variations are not intended to exclude other technical features, additions, components or steps. Other objects, benefits and features of the present invention will be revealed to one skilled in the art, partially from the specification and partially from the implementation of the present invention. The following examples and drawings will be provided as examples but they are not intended to limit the present invention.

Moreover, the present invention covers all possible combinations of example embodiments indicated in this specification. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as shown below.

Figure 2:
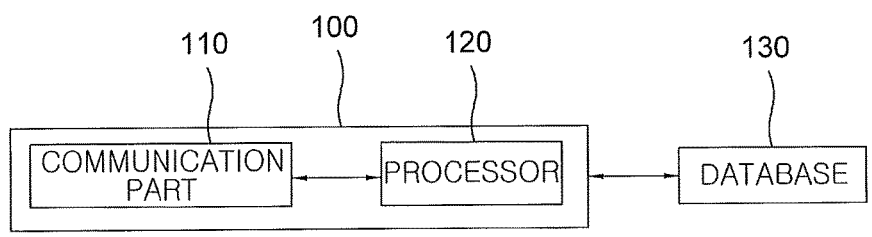
FIG. 2 is a drawing schematically illustrating a learning device of an object detector based on the R-CNN in accordance with one example embodiment of the present invention.

FIG. 2 is a drawing schematically illustrating a learning device of an object detector based on an R-CNN in accordance with one example embodiment of the present invention, and by referring to FIG. 2, the learning device 100 may include a communication part 110 and a processor 120.

First, the communication part 110 may receive at least one training image.

Herein, the training image may be stored in a database 130, and objects in the training image may be classified into at least one of class groups which respectively include each of one or more classes corresponding to each of the objects, and each of the training images including each of the objects corresponding to said each of the class groups may be stored as data sets for each of class groups. Additionally, the database 130 may store one or more ground truths with respect to class information and location information on each of the objects corresponding to each of the training images.

Next, the processor 120 may (i) instruct one or more convolutional layers to generate one or more feature maps by applying one or more convolution operations to the training image, (ii) instruct an RPN to output pieces of ROI regression information and pieces of matching information, where the ROI regression information includes regression information on each of ROI candidates corresponding to each of candidate regions estimated as including at least one object in a specific feature map among the feature maps, and the matching information includes information on one selected from the class groups which respectively include their corresponding one or more classes, where the one or more classes are determined by referring to information on the at least one object within said each of ROI candidates, (iii) instruct a proposal layer to output one or more specific ROI candidates, which have high probabilities of being one or more ROIs, among the ROI candidates, as one or more ROI proposals by referring to the ROI regression information and the matching information, and (iv) instruct a proposal-selecting layer to output each of the ROI proposals for each of said pieces of matching information by referring to the training image. Then, the processor 120 may instruct each of pooling layers corresponding to each of said pieces of matching information to generate each of feature vectors by pooling each region in the specific feature map corresponding to said each of the ROI proposals for each of said pieces of matching information, and may instruct each of FC layers corresponding to said each of the pooling layers to generate object regression information and object class information corresponding to said each of the ROI proposals for each of said pieces of matching information by referring to said each of the feature vectors. Thereafter, the processor 120 may instruct each of first loss layers corresponding to said each of the FC layers to calculate each object class loss and each object regression loss by referring to the object class information for each of said pieces of matching information, the object regression information for each of said pieces of matching information, and their corresponding first GTs, and to backpropagate said each object class loss and said each object regression loss, to thereby learn parameters of said each of the FC layers and the convolutional layers.

Herein, the processor 120 may instruct the RPN to backpropagate one or more second losses calculated by a second loss layer corresponding to the RPN, to thereby learn parameters of the RPN, where the second losses are acquired by referring to the ROI regression information, the matching information, and at least one second GT. Herein, a temporal order of backpropagating first losses and backpropagating the second losses is not fixed.

Figure 3:
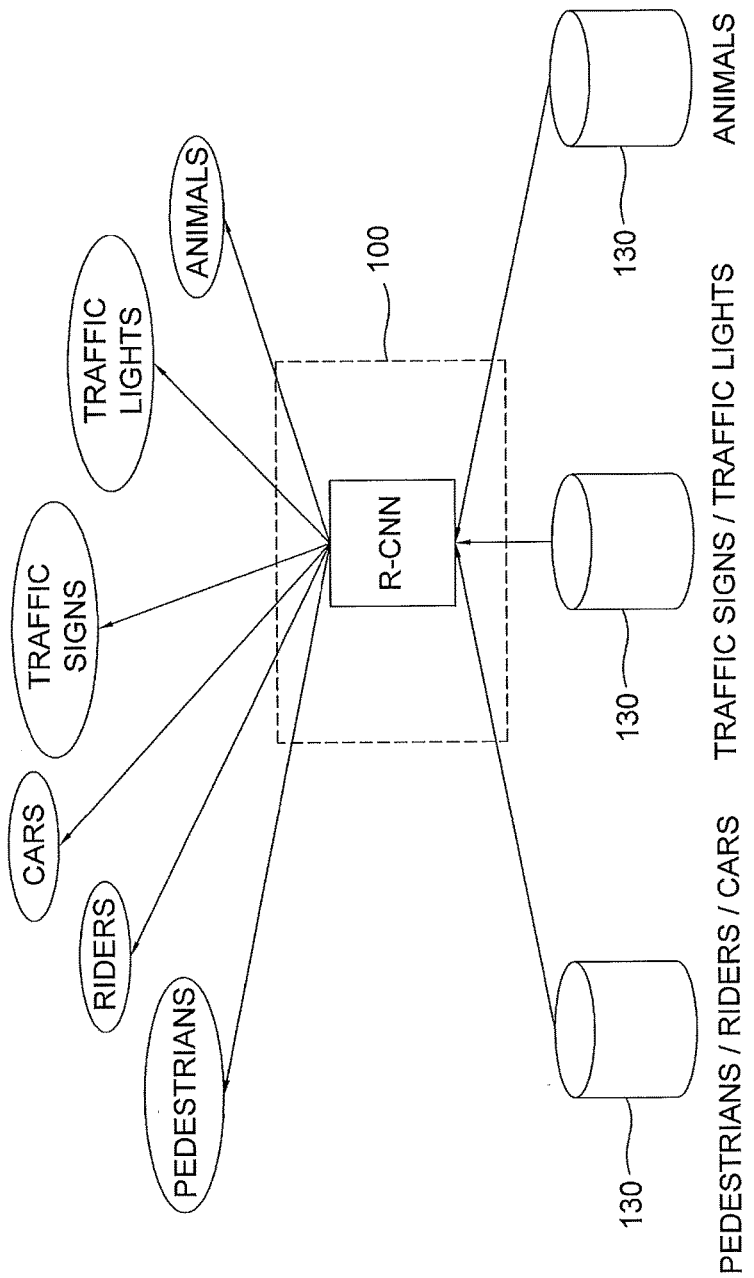
FIG. 3 is a drawing schematically illustrating a process of learning each of the class groups by the learning device of the object detector based on the R-CNN in accordance with one example embodiment of the present invention.
Figure 4:
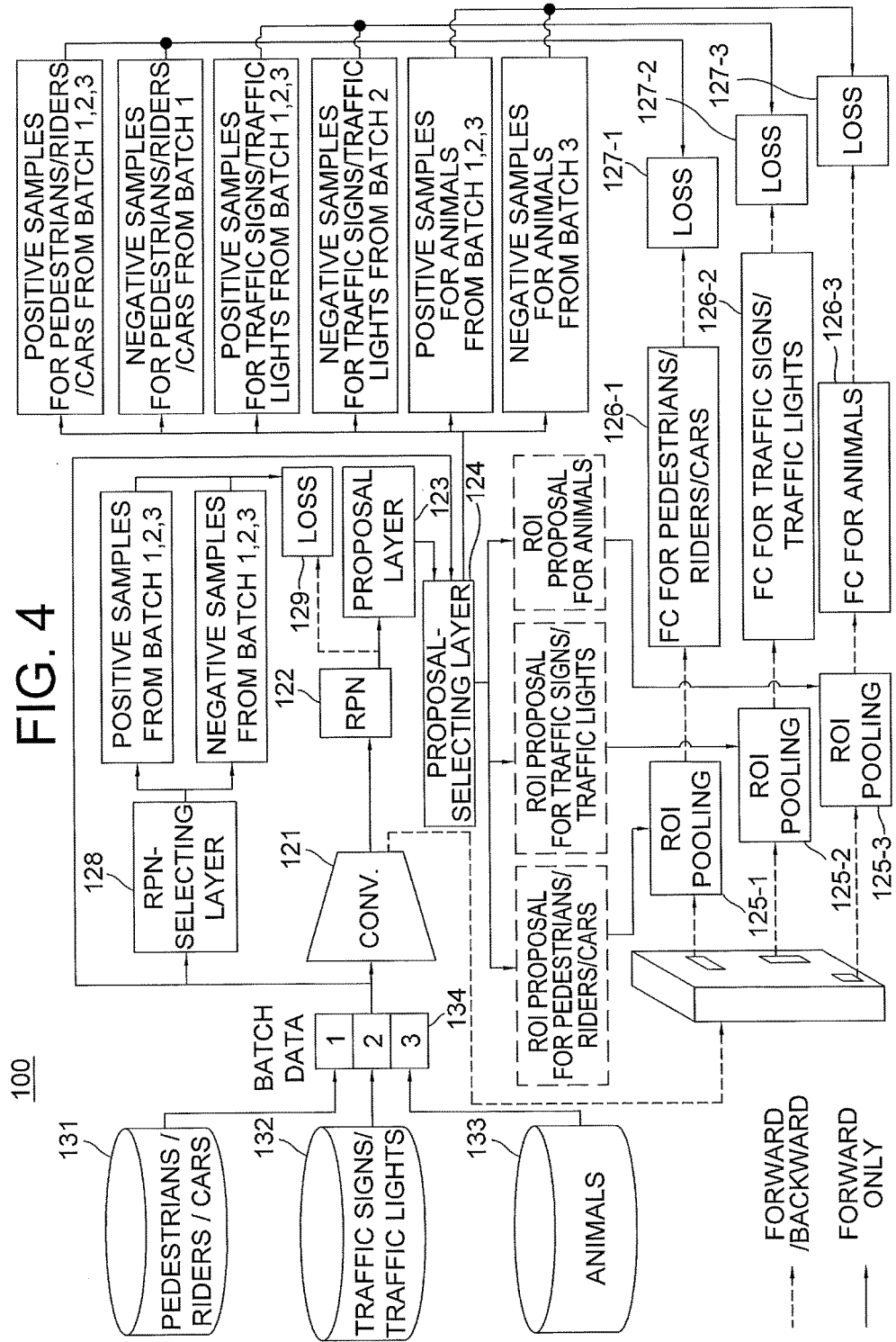
FIG. 4 is a drawing schematically illustrating a learning method of the object detector based on the R-CNN in accordance with one example embodiment of the present invention.

Describing these processes by referring to FIG. 3, if learning to detect six kinds of objects like pedestrians, riders, cars, traffic signs, traffic lights, and animals is to be performed, then (i) at least one data set for pedestrians, riders, and cars is set up comprised of training images including them, (ii) at least one data set for traffic signs and traffic lights is set up comprised of training images including them, and (iii) at least one data set for animals is set up comprised of training images including them. Thereafter, the processor 120 may learn or support another device to learn parameters of the object detector based on the R-CNN to detect pedestrians, riders, cars, traffic signs, traffic lights, and animals, by using the data set for pedestrians, riders, and cars, the data set for traffic signs and traffic lights, and the data set for animals. Herein, the data set for pedestrians, riders, and cars, the data set for traffic signs and traffic lights, and the data set for animals are illustrated in FIG. 3 as stored in a single database, however, each of the data sets may be stored respectively in separate databases as illustrated in FIG. 4 to be described next.

Herein, the learning device 100 of the present invention may be a computing device, and may be any digital device with a processor capable of computation. For reference, although FIG. 2 shows the single learning device 100, the scope of the present invention is not limited thereto, but the learning device may be configured as several devices to perform its functions.

A method of learning parameters of the object detector based on the R-CNN by using the learning device in accordance with one example embodiment of the present invention is described by referring to FIG. 4 as follows.

First, each of the batch data 134 is prepared by using the training images including the objects corresponding to each of the class groups, e.g., by using each of the data sets 131, 132, and 133 according to each of the class groups. Herein, each of the batch data 134 may include the training images corresponding to each of the class groups. Further, each of the batch data 134 may include the same number of the training images. Also, a specific training image among the training images in the batch data may include one or more objects only with classes belonging to a specific class group among the class groups, or may include one or more objects with classes belonging to two or more class groups among the class groups. Herein, each of the data sets 131, 132, and 133 according to the class groups is illustrated as stored respectively in each database, however, said each of the data sets may be stored in the single database 130 as illustrated in FIG. 3.

As one example, from the data set 131 for pedestrians, riders, and cars, the data set 132 for traffic signs and traffic lights, and the data set 133 for animals, (i) a first batch data may be prepared using the data set 131, (ii) a second batch data may be prepared using the data set 132, and (iii) a third batch data may be prepared using the data set 133.

Next, if the training images from each of the batch data 134 are inputted, the learning device 100 may instruct the convolutional layer 121 to apply the convolution operations to the training images, to thereby generate the feature maps.

Herein, the feature maps may have certain sizes and channel depths. Further, the convolutional layer 121 may be comprised of multiple layers, and each of the multiple layers may apply the convolution operation in series to the training images.

Next, the learning device 100 may instruct the RPN 122 to output said pieces of ROI regression information and said pieces of matching information. Herein, the ROI regression information includes regression information on said each of ROI candidates corresponding to each of candidate regions estimated as including the at least one object in the specific feature map, and the matching information includes information on one selected from the class groups which respectively include their corresponding classes, where the classes are determined by referring to information on the at least one object within said each of ROI candidates.

Herein, an RPN 122 may classify contents of the specific feature map into a background or one of the class groups, unlike conventional classification of the background and the objects.

As one example, the RPN 122 may output at least one piece of the matching information among those corresponding to the class group of pedestrians, riders, and cars, the class group of traffic signs and traffic lights, and the class group of animals, for each of the ROI candidates.

Then, the learning device 100 may instruct a proposal layer 123 to output the specific ROI candidates, which have high probabilities, i.e., high scores, of being the ROIs, as the ROI proposals by referring to the ROI regression information and the matching information, and may instruct a proposal-selecting layer 124 to output each of the ROI proposals for each of said pieces of matching information by referring to the training image.

As one example, the proposal-selecting layer 124 may output at least one of ROI proposals corresponding to the matching information among (i) the class group of pedestrians, riders, and cars for learning thereof, (ii) the class group of traffic signs and traffic lights for learning thereof, and (iii) the class group of animals for learning thereof.

Next, the learning device 100 may instruct each of pooling layers 125-1, 125-2, and 125-3 corresponding to each of said pieces of matching information to generate each of feature vectors by pooling each region in the specific feature map corresponding to each of the ROI proposals for each of said pieces of matching information.

As one example, the learning device 100 may instruct (i) the pooling layer 125-1 to pool a region, in the specific feature map, corresponding to the ROI proposal related to the matching information on the class group of pedestrians, riders, and cars, to thereby generate a feature vector corresponding to the matching information on the class group of pedestrians, riders, and cars, (ii) the pooling layer 125-2 to pool a region, in the specific feature map, corresponding to the ROI proposal related to the matching information on the class group of traffic signs and traffic lights, to thereby generate a feature vector corresponding to the matching information on the class group of traffic signs and traffic lights, and (iii) the pooling layer 125-3 to pool a region, in the specific feature map, corresponding to the ROI proposal related to the matching information on the class group of animals, to thereby generate a feature vector corresponding to the matching information on the class group of animals.

Herein, although each of the pooling layers 125-1, 125-2, and 125-3 corresponding to each piece of the matching information may generate each of the feature vectors by pooling each region, in the specific feature map, corresponding to each of the ROI proposals for each of said pieces of matching information as mentioned above, as another example, the algorithm may also be implemented as generating each feature vector by pooling regions, in the specific feature map, corresponding the ROI proposals for each piece of the matching information, by using a single pooling layer.

Next, the learning device 100 may instruct each of FC layers 126-1, 126-2, and 126-3 respectively corresponding to each of the pooling layers 125-1, 125-2, and 125-3 to generate object regression information and object class information corresponding to said each of the ROI proposals for each of said pieces of matching information by referring to each of the feature vectors.

As one example, the learning device 100 may instruct (i) the FC layer 126-1 corresponding to the pooling layer 125-1 to generate the object regression information and the object class information on pedestrians, riders, and cars by using the feature vector outputted from the pooling layer 125-1, (ii) the FC layer 126-2 corresponding to the pooling layer 125-2 to generate those on traffic signs and traffic lights by using the feature vector outputted from the pooling layer 125-2, and (iii) the FC layer 126-3 corresponding to the pooling layer 125-3 to generate those on animals by using the feature vector outputted from the pooling layer 125-3.

Herein, although each of the FC layers corresponding to each of the pooling layers is instructed to generate the object regression information and the object class information corresponding to said each of the ROI proposals for each of said pieces of matching information by referring to said each of the feature vectors, the algorithm may also be implemented as generating the object regression information and the object class information by using a single FC layer.

Then, the learning device 100 may instruct each of first loss layers 127-1, 127-2, and 127-3 corresponding to said each of the FC layers 126-1, 126-2, and 126-3 by referring to each piece of the object class information, each piece of the object regression information, and each of their corresponding first GTs, to calculate each object class loss and each object regression loss, and to backpropagate said each object class loss and said each object regression loss, to thereby learn parameters of said each of the FC layers 126-1, 126-2, and 126-3 and the convolutional layer 121. Herein, the first loss layers may be implemented as each of the first loss layers corresponding to each of the FC layers, or as one loss layer.

As one example, the learning device 100 may instruct (i) the first loss layer 127-1, among the first loss layers, corresponding to the FC layer 126-1 to calculate at least one object class loss and at least one object regression loss by referring to the object class information, the object regression information, and at least one of the first GTs, and to backpropagate the calculated object class loss and the calculated object regression loss, to thereby learn parameters of the FC layer 126-1 and the convolutional layer 121, (ii) the first loss layer 127-2, among the first loss layers, corresponding to the FC layer 126-2 to calculate at least one object class loss and at least one object regression loss by referring to the object class information, the object regression information, and at least one of the first GTs, and to backpropagate the calculated object class loss and the calculated object regression loss, to thereby learn parameters of the FC layer 126-2 and the convolutional layer 121, and (iii) the first loss layer 127-3, among the first loss layers, corresponding to the FC layer 126-3 to calculate at least one object class loss and at least one object regression loss by referring to the object class information, the object regression information, and at least one of the first GTs, and to backpropagate the calculated object class loss and the calculated object regression loss, to thereby learn parameters of the FC layer 126-3 and the convolutional layer 121.

Herein, the learning device 100 may instruct the proposal-selecting layer 124 to acquire each of the first GTs corresponding to each of the ROI proposals of each of said pieces of the matching information by referring to the training images, to thereby input said each of the first GTs into each of the first loss layers corresponding to each of said pieces of the matching information. As one example, (i) if the matching information is determined as corresponding to the class group of pedestrians, riders, and cars, then at least one of the first GTs corresponding to the ROI proposals of the matching information on the class group of pedestrians, riders, and cars may be inputted into the first loss layer 127-1, (ii) if the matching information is determined as corresponding to the class group of traffic signs and traffic lights, then at least one of the first GTs corresponding to the ROI proposals of the matching information on the class group of traffic signs and traffic lights may be inputted into the first loss layer 127-2, and (iii) if the matching information is determined as corresponding to the class group of animals, then at least one of the first GTs corresponding to the ROI proposals of the matching information on the class group of animals may be inputted into the first loss layer 127-3.

Then, the learning device 100 may instruct a second loss layer 129 corresponding to the RPN 122 to learn parameters of the RPN 122 by backpropagating one or more second losses acquired by referring to the ROI regression information, the matching information, and the at least one second GT.

Herein, the learning device 100 may instruct the RPN-selecting layer 128 to acquire each of the second GTs corresponding to each and every ROI candidate by referring to all of the training images in each of the batch data, to thereby input each of the second GTs into the second loss layer.

To briefly describe the case where the training image is determined as including first objects and second objects corresponding respectively to first matching information and second matching information among the matching information in the above processes of learning, the learning device 100 may instruct the proposal-selecting layer 124 to output first ROI proposals corresponding to the first matching information and second ROI proposals corresponding to the second matching information. Then, the learning device 100 may instruct (i) a first pooling layer corresponding to the first matching information to generate a first feature vector by pooling regions, in the feature map, corresponding to the first ROI proposals, and instruct a first FC layer corresponding to the first pooling layer to output first object class information and first object regression information of the first objects by using the first feature vector, and (ii) a second pooling layer corresponding to the second matching information to generate a second feature vector by pooling regions, in the feature map, corresponding to the second ROI proposals, and instruct a second FC layer corresponding to the second pooling layer to output second object class information and second object regression information of the second objects by using the second feature vector.

Thereafter, the learning device 100 may instruct (i) a 1-1 loss layer among the first loss layers which corresponds to the first FC layer to calculate at least one first object class loss and at least one first object regression loss by referring to the first object class information, the first object regression information, and at least one 1-1 GT among the first GTs, and to backpropagate the first object class loss and the first object regression loss, to thereby learn parameters of the first FC layers and the convolutional layer 121, and (ii) a 1-2 loss layer among the first loss layers which corresponds to the second FC layer to calculate at least one second object class loss and at least one second object regression loss by referring to the second object class information, the second object regression information, and at least one 1-2 GT among the first GTs, and to backpropagate the second object class loss and the second object regression loss, to thereby learn parameters of the second FC layers and the convolutional layer 121.

Herein, on the training image in each of the batch data corresponding to each of the class groups, every object corresponding to the class groups may be tagged, and objects not corresponding to the class groups may be partly tagged.

As one example, every pedestrian, rider, and car may be tagged, and part of traffic signs, traffic lights, and animals may be tagged, on every training image in the batch data corresponding to the class group of pedestrians, riders, and cars.

The problem in this situation is that part of the objects included in the class groups of traffic signs, traffic lights, and animals are not tagged, and that, therefore, when background is sampled for learning the class group of pedestrians, riders, and cars, the part of the objects which are included in the class groups of traffic signs, traffic lights, and/or animals, but are not tagged, may be sampled wrongly as the background. For example, in the batch data of the class group of pedestrians, riders, and cars, the not-tagged part of the objects corresponding to traffic signs, traffic lights, and/or animals may be included in background samples, resulting in a hindrance of the learning process. Similarly, in the batch data of the class group of traffic signs and traffic lights, the not-tagged part of the objects corresponding to pedestrians, riders, and cars may have problems of being recognized as background in the learning process.

Especially, when learning the RPN, because the background samples are selected randomly from the whole image region, the objects not tagged have low probabilities of being selected as the background samples and thus will not be a big problem, however, when learning the FC layer, because the RPN selects candidate regions assumed as objects and the background samples are selected from those candidate regions, if training data includes objects not tagged then their corresponding regions will be wrongly selected as the background samples and will be a big problem. To prevent this, when learning the FC layer, the background samples must be selected from the batch data corresponding to the class group of interest. For example, the background samples for the FC layer corresponding to the class group of pedestrians, riders, and cars must be selected from the batch data corresponding to the class group of pedestrians, riders, and cars.

For this purpose, in the learning method in accordance with one example embodiment of the present invention, the learning device 100 may instruct the proposal-selecting layer 124 to (i) extract positive samples corresponding to the class group of pedestrians, riders, and cars from the first batch data, the second batch data, and the third batch data, and extract negative samples corresponding to the class group of pedestrians, riders, and cars from the first batch data, to thereby input at least one of the first GTs for learning the class group of pedestrians, riders, and cars into the first loss layer 127-1, (ii) extract positive samples corresponding to the class group of traffic signs and traffic lights from the first batch data, the second batch data, and the third batch data, and extract negative samples corresponding to the class group of traffic signs and traffic lights from the second batch data, to thereby input at least one of the first GTs for learning the class group of traffic signs and traffic lights into the second loss layer 127-2, and (iii) extract positive samples corresponding to the class group of animals from the first batch data, the second batch data, and the third batch data, and extract negative samples corresponding to the class group of animals from the third batch data, to thereby input at least one of the first GTs for learning the class group of animals into a third loss layer 127-3.

Then, each of the first loss layers 127-1, 127-2, and 127-3 may calculate the object class loss and the object regression loss, by using at least one first positive GT of the positive samples tagged as objects corresponding to the matching information and using at least one first negative GT of negative samples not tagged as the objects corresponding to the matching information, for each of the training images in the batch data.

Meanwhile, the at least one second GT may include at least one second positive GT of the positive samples tagged as objects with their corresponding class groups, and may include at least one second negative GT of the negative samples not tagged as the objects with their corresponding class groups, for each of the training images in the batch data.

Figure 5:
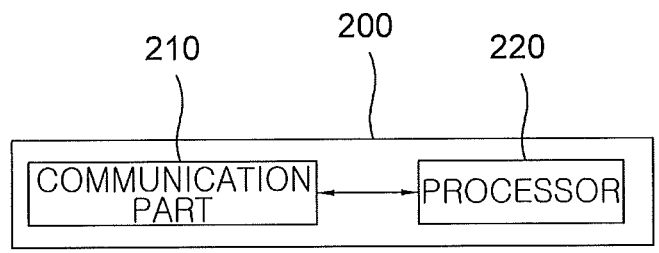
FIG. 5 is a drawing schematically illustrating a testing device of the object detector based on the R-CNN in accordance with one example embodiment of the present invention.

FIG. 5 is a drawing schematically illustrating a testing device of the object detector based on the R-CNN in accordance with one example embodiment of the present invention, and by referring to FIG. 5, the testing device 200 may include a communication part 210 and a processor 220.

First, the communication part 210 may receive at least one test image.

Next, the processor 220 may perform (i) a first process of instructing the convolutional layers to generate one or more feature maps for testing by applying the convolution operations to the test image, (ii) a second process of instructing (ii-1) the RPN to output pieces of ROI regression information for testing and pieces of matching information for testing where the ROI regression information for testing includes regression information on each of ROI candidates for testing corresponding to each of candidate regions estimated as including at least one object for testing in a specific feature map for testing among the feature maps for testing, and the matching information for testing includes information on one selected from the class groups which respectively include their corresponding classes, and where the classes are determined by referring to information on the at least one object for testing within said each of ROI candidates for testing, and (ii-2) the proposal layer to output one or more specific ROI candidates, which have high probabilities of being one or more ROIs, among the ROI candidates for testing, as one or more ROI proposals for testing for each of said pieces of matching information for testing by referring to the ROI regression information for testing and the matching information for testing, and (iii) a third process of instructing (iii-1) each pooling layer corresponding to each piece of the matching information for testing to pool regions, in the specific feature map for testing, corresponding to the ROI proposals for testing, to thereby generate each feature vector for testing, and (iii-2) each FC layer corresponding to said each pooling layer to generate object class information for testing corresponding to each of the ROI proposals for each piece of the matching information for testing and object regression information for testing by using said each feature vector for testing.

Herein, each of the FC layers and the convolutional layer have been learned by the learning method of the learning device described referring to FIGS. 1 to 4, and to briefly explain the processes, if the training image is inputted, (i) the convolutional layer may be instructed to generate one or more feature maps for training by applying the convolution operations to the training image, (ii) the RPN may be instructed to output pieces of ROI regression information for training and pieces of matching information for training where the ROI regression information for training includes regression information on each of ROI candidates for training corresponding to each of candidate regions estimated as including at least one object for training in a specific feature map for training among the feature maps for training, and the matching information for training includes information on one selected from the class groups which respectively include their corresponding classes, where the classes are determined by referring to information on the at least one object for training within said each of ROI candidates for training, (iii) the proposal layer may be instructed to output one or more specific ROI candidates for training, which have high probabilities of being one or more ROIs, among the ROI candidates for training, as one or more ROI proposals for training for each of said pieces of matching information for training by referring to the ROI regression information for training and the matching information for training, (iv) the proposal-selecting layer may be instructed to output each of the ROI proposals for training for each of said pieces of matching information for training by referring to the training image, (v) said each pooling layer corresponding to each piece of the matching information for training may be instructed to pool regions, in the specific feature map for training, corresponding to the ROI proposals for training, to thereby generate each feature vector for training, and each FC layer corresponding to said each pooling layer may be instructed to generate object class information for training corresponding to each of the ROI proposals for training for each piece of the matching information for training and object regression information for training by using said each feature vector for training, (vi) each of the first loss layers corresponding to each of the FC layers may be instructed to acquire each object class loss for training and each object regression loss for training by referring to object class information for training of each of the FC layers, object regression information for training, and each of the first GTs, to thereby learn parameters of each of the FC layers and the convolutional layer by backpropagating said each object class loss for training and said each object regression loss for training.

Herein, parameters of the RPN may have been learned by backpropagating one or more second losses calculated by the second loss layer according to instruction of the learning device, to thereby learn parameters of the RPN, where the second losses are acquired by referring to the ROI regression information for training, the matching information for training, and at least one second GT.

Herein, the testing device 200 in accordance with one example embodiment of the present invention may be a computing device, and may be any device with a processor capable of computation. For reference, although FIG. 5 shows the single testing device 200, the scope of the present invention is not limited thereto, but the testing device may be configured as several devices to perform its functions.

Figure 6:
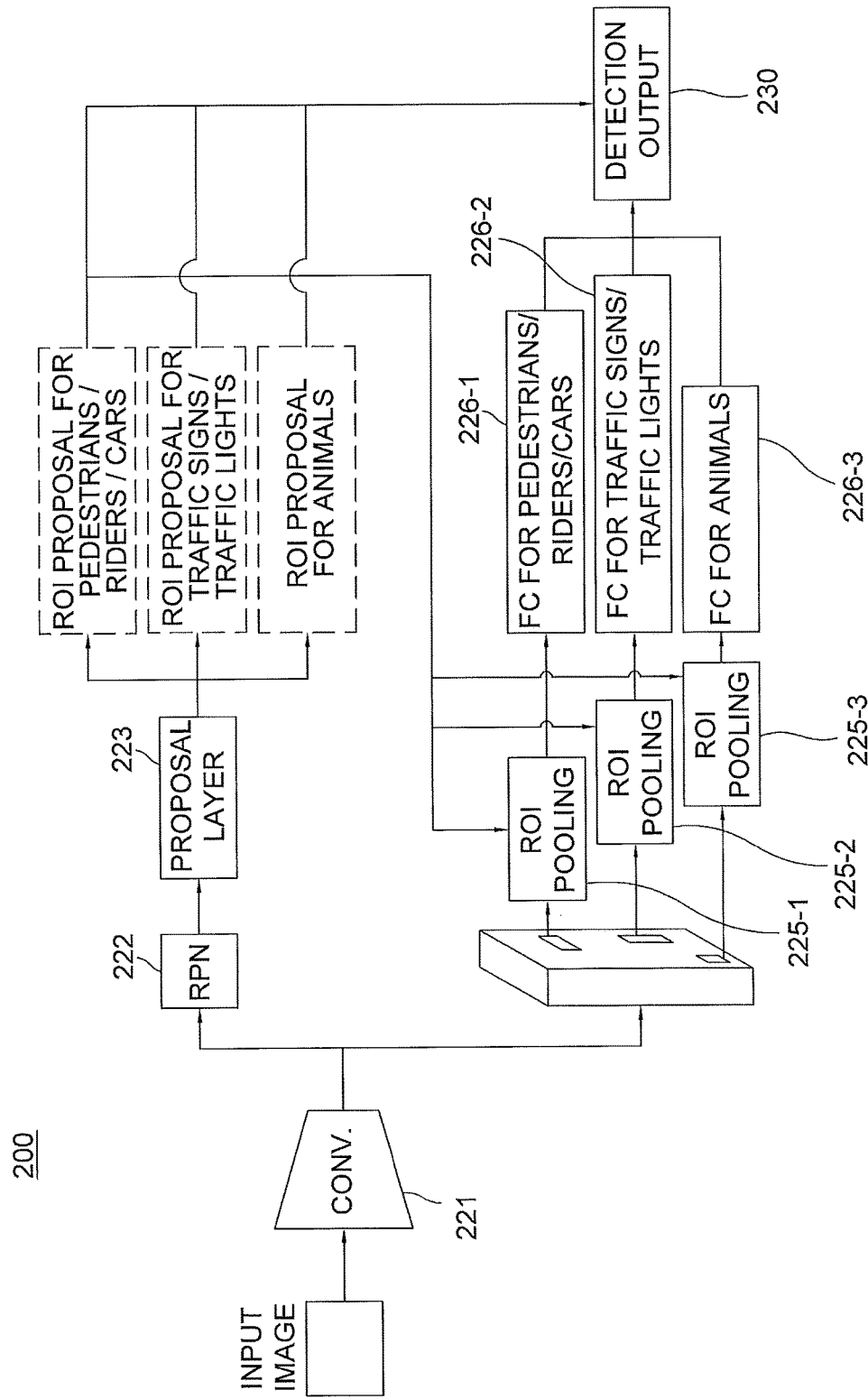
FIG. 6 is a drawing schematically illustrating a testing method of the object detector based on the R-CNN in accordance with one example embodiment of the present invention.

A method of testing the object detector based on the R-CNN by using the testing device of the object detector based on the R-CNN configured as such in accordance with one example embodiment of the present invention is described by referring to FIG. 6 as follows.

First, on condition that, if the training image has been inputted, the learning device has instructed (i) the convolutional layer 221 to generate one or more feature maps for training by applying the convolution operations to the training image, (ii) the RPN 22 to output pieces of ROI regression information for training and pieces of matching information for training where the ROI regression information for training includes regression information on each of ROI candidates for training corresponding to each of candidate regions estimated as including at least one object for training in a specific feature map for training among the feature maps for training, and the matching information for training includes information on one selected from the class groups which respectively include their corresponding classes, where the classes are determined by referring to information on the at least one object for training within said each of ROI candidates for training, (iii) the proposal layer 223 to output one or more specific ROI candidates for training, which have high probabilities of being one or more ROIs, among the ROI candidates for training, as one or more ROI proposals for training by referring to the ROI regression information for training and the matching information for training, (iv) the proposal-selecting layer, not illustrated, to output each of the ROI proposals for training for each of said pieces of matching information for training by referring to the training image, (v) each of the pooling layers 225-1, 225-2, and 225-3 corresponding to each of said pieces of matching information for training to generate each of feature vectors for training by pooling each region in the specific feature map for training corresponding to said each of the ROI proposals for training for each of said pieces of matching information for training, (vi) each of the FC layers 225-1, 225-2, and 225-3 corresponding to said each of the pooling layers to generate object regression information for training and object class information for training corresponding to said each of the ROI proposals for training for each of said pieces of matching information for training by referring to said each of the feature vectors for training, and (vii) each of first loss layers, not illustrated, corresponding to said each of the FC layers 26-1, 226-2, and 226-3 to calculate each object class loss and each object regression loss by referring to the object class information for training for each of said pieces of matching information for training, the object regression information for training for each of said pieces of matching information for training, and each of their corresponding first GTs, to thereby backpropagate said each object class loss and said each object regression loss to learn parameters of said each of the FC layers 226-1, 226-3, and 226-3 and the convolutional layer 221, then, if the test image is inputted, the testing device 200 may instruct the convolutional layer 221 to apply the convolution operations to the test image, to thereby output the feature map for testing.

Herein, parameters of the RPN 222 may have been learned by backpropagating the second losses calculated by the second loss layer, not illustrated, corresponding to the RPN 222, according to instruction of the learning device, to thereby learn parameters of the RPN 222, where the second losses are acquired by referring to the ROI regression information for training, the matching information for training, and at least one second GT.

Next, the testing device 200 may instruct the RPN 222 to output pieces of ROI regression information for testing and pieces of matching information for testing where the ROI regression information for testing includes regression information on each of ROI candidates for testing corresponding to each of candidate regions estimated as including at least one object for testing in the specific feature map for testing among the feature maps for testing, and the matching information for testing includes information on one selected from the class groups which respectively include their corresponding classes, where the classes are determined by referring to information on the at least one object for testing within said each of ROI candidates for testing.

Then, the testing device 200 may instruct the proposal layer 223 to output one or more specific ROI candidates for testing among the ROI candidates for testing, as one or more ROI proposals for testing by referring to the ROI regression information for testing and the matching information for testing.

As one example, the proposal layer 223 may output at least one ROI proposal corresponding to the matching information on the class group of pedestrians, riders, and cars for testing thereof, at least one ROI proposal corresponding to the matching information on the class group of traffic signs and traffic lights for testing thereof, and at least one ROI proposal corresponding to the matching information on the class group of animals for testing thereof.

Next, the testing device 200 may instruct each of the pooling layers 225-1, 225-2, and 225-3 corresponding to each piece of matching information for testing to generate each of feature vectors for testing by pooling each region in the specific feature map for testing corresponding to said each of the ROI proposals for testing for each of said pieces of matching information for testing. Herein, although each of the pooling layers 225-1, 225-2, and 225-3 is implemented as separate from each other, the algorithm may also be implemented as generating each feature vector for testing by pooling regions in the specific feature map for testing corresponding the ROI proposals for testing for each piece of the matching information for testing, by using a single pooling layer.

As one example, the testing device 200 may instruct the pooling layer 225-1 to pool a region, in the specific feature map for testing, corresponding to the ROI proposal for testing related to the matching information for testing on the class group of pedestrians, riders, and cars, to thereby generate a feature vector for testing corresponding to the matching information for testing on the class group of pedestrians, riders, and cars, may instruct the pooling layer 225-2 to pool a region, in the specific feature map for testing, corresponding to the ROI proposal for testing related to the matching information for testing on the class group of traffic signs and traffic lights, to thereby generate a feature vector for testing corresponding to the matching information for testing on the class group of traffic signs and traffic lights, and may instruct the pooling layer 225-3 to pool a region, in the specific feature map for testing, corresponding to the ROI proposal for testing related to the matching information for testing on the class group of animals, to thereby generate a feature vector for testing corresponding to the matching information for testing on the class group of animals.

Next, the testing device 200 may instruct each of the FC layers 226-1, 226-2, and 226-3 respectively corresponding to each of the pooling layers 225-1, 225-2, and 225-3 to generate object regression information for testing, for each of said pieces of matching information, and object class information for testing, for each of said pieces of matching information, corresponding to said each of the ROI proposals for testing for each piece of the matching information for testing by referring to each of the feature vectors for testing. Herein, although each of the FC layers 226-1, 226-2, and 226-3 is implemented as separate from each other, the algorithm may also be implemented as generating the object regression information for testing and the object class information for testing corresponding to said each of the ROI proposals for testing for each piece of the matching information for testing by referring to the feature vectors for testing, by using a single pooling layer.

As one example, the testing device 200 may instruct the FC layer 226-1 corresponding to the pooling layer 225-1 to generate the object regression information for testing and the object class information for testing on pedestrians, riders, and cars by using the feature vector for testing outputted from the pooling layer 225-1, may instruct the FC layer 226-2 corresponding to the pooling layer 225-2 to generate those on traffic signs and traffic lights by using the feature vector for testing outputted from the pooling layer 225-2, and may instruct the FC layer 226-3 corresponding to the pooling layer 225-3 to generate those on animals by using the feature vector for testing outputted from the pooling layer 225-3.

Then, the testing device 200 may instruct its outputting layer 230 to display object information corresponding to the objects for testing on the test images, by referring to the ROI proposals for testing for each piece of the matching information for testing outputted from the proposal layer 223, and the object regression information for testing and the object class information for testing outputted from the FC layers 226-1, 226-2, and 226-3.

The present invention has an effect of easily acquiring data sets for learning the object detector based on the R-CNN by using a single deep learning network for learning, given multiple different data sets.

The present invention has another effect of reducing execution time of the object detector by using a single R-CNN network learned from the multiple different data sets, compared to conventional use of multiple R-CNN networks.

The present invention has still another effect of reducing development time and cost for the object detector, by providing the object detector based on the R-CNN using the single deep learning network learned from the multiple different data sets.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a compiler but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for learning parameters of an object detector based on an R-CNN (Region-based CNN), comprising steps of:
    (a) if at least one training image is acquired, a learning device (i) instructing one or more convolutional layers to generate one or more feature maps by applying one or more convolution operations to the training image, (ii) instructing an RPN (Region Proposal Network) to output pieces of ROI (Region of Interest) regression information and pieces of matching information wherein the ROI regression information includes regression information on each of ROI candidates corresponding to each of candidate regions estimated as including at least one object in a specific feature map among the feature maps, and the matching information includes information on one selected from class groups which respectively include their corresponding one or more classes, wherein the one or more classes are determined by referring to information on the at least one object within said each of ROI candidates, (iii) instructing a proposal layer to output one or more specific ROI candidates, which have high probabilities of being one or more ROIs, among the ROI candidates, as one or more ROI proposals by referring to the ROI regression information and the matching information, and (iv) instructing a proposal-selecting layer to output each of the ROI proposals for each of said pieces of matching information by referring to the training image;

(b) the learning device instructing each of pooling layers corresponding to each of said pieces of matching information to generate each of feature vectors by pooling each region in the specific feature map corresponding to said each of the ROI proposals for each of said pieces of matching information, and instructing each of FC layers (Fully Connected layers) corresponding to said each of the pooling layers to generate object regression information and object class information corresponding to said each of the ROI proposals for each of said pieces of matching information by referring to said each of the feature vectors; and (c) the learning device instructing each of first loss layers corresponding to said each of the FC layers to calculate each object class loss and each object regression loss by referring to the object class information for each of said pieces of matching information, the object regression information for each of said pieces of matching information, and their corresponding first GTs (Ground Truths), and to backpropagate said each object class loss and said each object regression loss, to thereby learn parameters of said each of the FC layers and the convolutional layers.

2. The method of claim 1, wherein the learning device instructs a second loss layer corresponding to the RPN to learn parameters of the RPN by backpropagating one or more second losses acquired by referring to the ROI regression information, the matching information, and at least one second GT.

3. The method of claim 1, wherein, if the training image is determined as including first objects and second objects corresponding respectively to first matching information and second matching information among the matching information, at the step of (a), the learning device instructs the proposal-selecting layer to output first ROI proposals and second ROI proposals corresponding respectively to the first matching information and the second matching information, at the step of (b), the learning device (i) instructs a first pooling layer corresponding to the first matching information to generate a first feature vector by pooling regions, in the specific feature map, corresponding to the first ROI proposals, and instructs a first FC layer corresponding to the first pooling layer to output first object class information and first object regression information of the first objects by using the first feature vector, and (ii) instructs a second pooling layer corresponding to the second matching information to generate a second feature vector by pooling regions, in the feature map, corresponding to the second ROI proposal, and instructs a second FC layer corresponding to the second pooling layer to output second object class information and second object regression information of the second objects by using the second feature vector, and at the step of (c), the learning device (i) instructs a 1-1 loss layer among the first loss layers corresponding to the first FC layer to calculate at least one first object class loss and at least one first object regression loss by referring to the first object class information, the first object regression information, and at least one 1-1 GT among the first GTs, and to backpropagate the first object class loss and the first object regression loss, to thereby learn parameters of the first FC layers and the convolutional layers, and (ii) instructs a 1-2 loss layer among the first loss layers corresponding to the second FC layer to calculate at least one second object class loss and at least one second object regression loss by referring to the second object class information, the second object regression information, and at least one 1-2 GT among the first GTs, and to backpropagate the second object class loss and the second object regression loss, to thereby learn parameters of the second FC layers and the convolutional layers.

4. The method of claim 1, wherein, before the step of (a), the learning device acquires the training images as each batch data wherein the training images include each of objects corresponding to each of the class groups.

5. The method of claim 4, wherein said each batch data includes same number of the training images corresponding to each of the class groups.

6. The method of claim 4, wherein, a specific training image among the training images in the batch data includes objects only with classes in a specific class group among the class groups, or includes objects with classes in two or more of the class groups.

7. The method of claim 4, wherein, at the step of (a), the learning device instructs the RPN to learn parameters of the RPN for all the training images in the batch data.

8. The method of claim 7, wherein, the at least one second GT includes at least one second positive GT of positive samples tagged as objects with their corresponding class groups, and at least one second negative GT of negative samples not tagged as the objects with their corresponding class groups, for each of the training images in the batch data.

9. The method of claim 4, wherein, at the step of (c), the learning device instructs each of the first loss layers to calculate the object class loss and the object regression loss, by using at least one first positive GT of positive samples tagged as objects corresponding to the matching information and at least one first negative GT of negative samples not tagged as the objects corresponding to the matching information, for each of the training images in the batch data.

10. The method of claim 1, wherein the learning device instructs the proposal-selecting layer to acquire said each of the first GTs corresponding to said each of the ROI proposals for each of said pieces of the matching information by referring to the training images, to thereby input each of the first GTs into each of the first loss layers corresponding to each of said pieces of the matching information.

11. A method for testing an object detector based on an R-CNN (Region-based CNN), comprising steps of:

(a) on condition that a learning device has instructed (i) one or more convolutional layers to generate one or more feature maps for training by applying one or more convolution operations to at least one training image, (ii) an RPN (Region Proposal Network) to output pieces of ROI (Region of Interest) regression information for training and pieces of matching information for training where the ROI regression information for training includes regression information on each of ROI candidates for training corresponding to each of candidate regions estimated as including at least one object for training in a specific feature map for training among the feature maps for training, and the matching information for training includes information on one selected from class groups which respectively include their corresponding one or more classes, wherein the classes are determined by referring to information on the at least one object for training within said each of ROI candidates for training, (iii) a proposal layer to output one or more specific ROI candidates for training, which have high probabilities of being one or more ROIs, among the ROI candidates for training, as one or more ROI proposals for training by referring to the ROI regression information for training and the matching information for training, (iv) a proposal-selecting layer to output each of the ROI proposals for training for each of said pieces of matching information for training by referring to the training image, (v) each of pooling layers to each of said pieces of matching information for training to generate each of feature vectors for training by pooling each region in the specific feature map for training corresponding to said each of the ROI proposals for training for each of said pieces of matching information for training, and each of FC layers (Fully Connected layers) corresponding to said each of the pooling layers to generate object regression information for training and object class information for training corresponding to said each of the ROI proposals for training for each of said pieces of matching information for training by referring to said each of the feature vectors for training, and (vi) each of first loss layers corresponding to said each of the FC layers to calculate each object class loss and each object regression loss by referring to the object class information for training, the object regression information for training, and each of their corresponding first GTs (Ground Truths), to thereby backpropagate said each object class loss and said each object regression loss to learn parameters of said each of the FC layers and the convolutional layers, then, if at least one test image is inputted, a testing device instructing the convolutional layers to apply the convolution operations to the test image, to thereby output one or more feature maps for testing;

(b) the testing device instructing (i) the RPN to output pieces of ROI regression information for testing and pieces of matching information for testing wherein the ROI regression information for testing includes regression information on each of ROI candidates corresponding to each of candidate regions estimated as including at least one object for testing in a specific feature map among the feature maps for testing, and the matching information for testing includes information on one selected from class groups which respectively include their corresponding one or more classes, wherein the classes are determined by referring to information on the at least one object for testing within said each of ROI candidates, (ii) the proposal layer to output one or more specific ROI candidates, which have high probabilities of being one or more ROIs, among the ROI candidates, as one or more ROI proposals for testing for each of said pieces of matching information for testing by referring to the ROI regression information for testing and the matching information for testing; and (c) the testing device instructing each of pooling layers corresponding to each of said pieces of matching information for testing to generate each of feature vectors for testing by pooling each region in the specific feature map for testing corresponding to said each of the ROI proposals for testing for each of said pieces of matching information for testing, and instructing each of FC layers corresponding to said each of the pooling layers to generate object regression information for testing and object class information for testing corresponding to said each of the ROI proposals for testing for each of said pieces of matching information for testing by referring to said each of the feature vectors for testing.

12. The method of claim 11, wherein, at the step of (a), parameters of the RPN have been learned by backpropagating one or more second losses calculated by a second loss layer according to instruction of the learning device, and wherein the second losses have been acquired by referring to the ROI regression information for training, the matching information for training, and at least one second GT.

13. The method of claim 11, wherein, if the test image is determined as including first objects for testing and second objects for testing corresponding respectively to first matching information for testing and second matching information for testing among the matching information for testing,
at the step of (b), the testing device instructs the proposal layer to output first ROI proposals for testing and second ROI proposals for testing corresponding respectively to the first matching information for testing and the second matching information for testing,
at the step of (c), the testing device (i) instructs a first pooling layer corresponding to the first matching information for testing to generate a first feature vector for testing by pooling regions, in the specific feature map for testing, corresponding to the first ROI proposals for testing, and instructs a first FC layer corresponding to the first pooling layer to output first object class information for testing and first object regression information for testing of the first objects for testing by using the first feature vector for testing, and (ii) instructs a second pooling layer corresponding to the second matching information for testing to generate a second feature vector for testing by pooling regions, in the specific feature map for testing, corresponding to the second ROI proposal for testing, and instructs a second FC layer corresponding to the second pooling layer to output second object class information for testing and second object regression information for testing of the second objects for testing by using the second feature vector for testing.

14. The method of claim 11, further comprising a step of:
(d) the testing device instructing its outputting layer to display object information corresponding to the objects for testing on the test image, by referring to the ROI proposals for testing for each piece of the matching information for testing outputted from the proposal layer, and the object regression information for testing and the object class information for testing outputted from said each of FC layers.

15. A learning device for learning parameters of an object detector based on an R-CNN (Region-based CNN), comprising:

a communication part for acquiring at least one training image; and a processor for performing processes of (I) instructing one or more convolutional layers to generate one or more feature maps by applying one or more convolution operations to the training image, (II) instructing an RPN (Region Proposal Network) to output pieces of ROI (Region of Interest) regression information and pieces of matching information wherein the ROI regression information includes regression information on each of ROI candidates corresponding to each of candidate regions estimated as including at least one object in a specific feature map among the feature maps, and the matching information includes information on one selected from class groups which respectively include their corresponding one or more classes, wherein the one or more classes are determined by referring to information on the at least one object within said each of ROI candidates, (III) instructing a proposal layer to output one or more specific ROI candidates, which have high probabilities of being one or more ROIs, among the ROI candidates, as one or more ROI proposals by referring to the ROI regression information and the matching information, and (IV) instructing a proposal-selecting layer to output each of the ROI proposals for each of said pieces of matching information by referring to the training image, (V) instructing each of pooling layers corresponding to each of said pieces of matching information to generate each of feature vectors by pooling each region in the specific feature map corresponding to said each of the ROI proposals for each of said pieces of matching information, and instructing each of FC layers (Fully Connected layers) corresponding to said each of the pooling layers to generate object regression information and object class information corresponding to said each of the ROI proposals for each of said pieces of matching information by referring to said each of the feature vectors, and (VI) instructing each of first loss layers corresponding to said each of the FC layers to calculate each object class loss and each object regression loss by referring to the object class information for each of said pieces of matching information, the object regression information for each of said pieces of matching information, and their corresponding first GTs (Ground Truths), and to backpropagate said each object class loss and said each object regression loss, to thereby learn parameters of said each of the FC layers and the convolutional layers.

16. The learning device of claim 15, wherein the processor instructs a second loss layer corresponding to the RPN to learn parameters of the RPN by backpropagating one or more second losses acquired by referring to the ROI regression information, the matching information, and at least one second GT.

17. The learning device of claim 15, wherein, if the training image is determined as including first objects and second objects corresponding respectively to first matching information and second matching information among the matching information, at the process of (IV), the processor instructs the proposal-selecting layer to output first ROI proposals and second ROI proposals corresponding respectively to the first matching information and the second matching information, at the process of (V), the processor (i) instructs a first pooling layer corresponding to the first matching information to generate a first feature vector by pooling regions, in the specific feature map, corresponding to the first ROI proposals, and instructs a first FC layer corresponding to the first pooling layer to output first object class information and first object regression information of the first objects by using the first feature vector, and (ii) instructs a second pooling layer corresponding to the second matching information to generate a second feature vector by pooling regions, in the feature map, corresponding to the second ROI proposal, and instructs a second FC layer corresponding to the second pooling layer to output second object class information and second object regression information of the second objects by using the second feature vector, and at the process of (VI), the processor (i) instructs a 1-1 loss layer among the first loss layers corresponding to the first FC layer to calculate at least one first object class loss and at least one first object regression loss by referring to the first object class info nation, the first object regression information, and at least one 1-1 GT among the first GTs, and to backpropagate the first object class loss and the first object regression loss, to thereby learn parameters of the first FC layers and the convolutional layers, and (ii) instructs a 1-2 loss layer among the first loss layers corresponding to the second FC layer to calculate at least one second object class loss and at least one second object regression loss by referring to the second object class information, the second object regression information, and at least one 1-2 GT among the first GTs, and to backpropagate the second object class loss and the second object regression loss, to thereby learn parameters of the second FC layers and the convolutional layers.

18. The learning device of claim 15, wherein the communication part acquires the training images as each batch data wherein the training images include each of objects corresponding to each of the class groups.

19. The learning device of claim 18, wherein said each batch data includes same number of the training images corresponding to each of the class groups.

20. The learning device of claim 18, wherein a specific training image among the training images in the batch data includes objects only with classes in a specific class group among the class groups, or includes objects with classes in two or more of the class groups.

21. The learning device of claim 18, wherein, at the process of (II), the processor instructs the RPN to learn parameters of the RPN for all the training images in the batch data.

22. The learning device of claim 21, wherein, the at least one second GT includes at least one second positive GT of positive samples tagged as objects with their corresponding class groups, and at least one second negative GT of negative samples not tagged as the objects with their corresponding class groups, for each of the training images in the batch data.

23. The learning device of claim 18, wherein, at the process of (VI), the processor instructs each of the first loss layers to calculate the object class loss and the object regression loss, by using at least one first positive GT of positive samples tagged as objects corresponding to the matching information and at least one first negative GT of negative samples not tagged as the objects corresponding to the matching information, for each of the training images in the batch data.

24. The learning device of claim 15, wherein the processor instructs the proposal-selecting layer to acquire said each of the first GTs corresponding to said each of the ROI proposals for each of said pieces of the matching information by referring to the training images, to thereby input each of the first GTs into each of the first loss layers corresponding to each of said pieces of the matching information.

25. A testing device for testing an object detector based on an R-CNN (Region-based CNN), comprising:
  a communication part for acquiring at least one test image, on condition that a learning device has instructed (i) one or more convolutional layers to generate one or more feature maps for training by applying one or more convolution operations to at least one training image, (ii) an RPN (Region Proposal Network) to output pieces of ROI (Region of Interest) regression information for training and pieces of matching information for training where the ROI regression information for training includes regression information on each of ROI candidates for training corresponding to each of candidate regions estimated as including at least one object for training in a specific feature map for training among the feature maps for training, and the matching information for training includes information on one selected from class groups which respectively include their corresponding one or more classes, wherein the classes are determined by referring to information on the at least one object for training within said each of ROI candidates for training, (iii) a proposal layer to output one or more specific ROI candidates for training, which have high probabilities of being one or more ROIs, among the ROI candidates for training, as one or more ROI proposals for training by referring to the ROI regression information for training and the matching information for training, (iv) a proposal-selecting layer to output each of the ROI proposals for training for each of said pieces of matching information for training by referring to the training image, (v) each of pooling layers to each of said pieces of matching information for training to generate each of feature vectors for training by pooling each region in the specific feature map for training corresponding to said each of the ROI proposals for training for each of said pieces of matching information for training, and each of FC layers (Fully Connected layers) corresponding to said each of the pooling layers to generate object regression information for training and object class information for training corresponding to said each of the ROI proposals for training for each of said pieces of matching information for training by referring to said each of the feature vectors for training, and (vi) each of first loss layers corresponding to said each of the FC layers to calculate each object class loss and each object regression loss by referring to the object class information for training, the object regression information for training, and each of their corresponding first GTs (Ground Truths), to thereby backpropagate said each object class loss and said each object regression loss to learn parameters of said each of the FC layers and the convolutional layers; and
  a processor performing processes of (I) instructing the convolutional layers to apply the convolution operations to the test image, to thereby output one or more feature maps for testing, (II) instructing (i) the RPN to output pieces of ROI regression information for testing and pieces of matching information for testing wherein the ROI regression information for testing includes regression information on each of ROI candidates corresponding to each of candidate regions estimated as including at least one object for testing in a specific feature map among the feature maps for testing, and the matching information for testing includes information on one selected from class groups which respectively include their corresponding one or more classes, wherein the classes are determined by referring to information on the at least one object for testing within said each of ROI candidates, (ii) the proposal layer to output one or more specific ROI candidates, which have high probabilities of being one or more ROIs, among the ROI candidates, as one or more ROI proposals for testing for each of said pieces of matching information for testing by referring to the ROI regression information for testing and the matching information for testing, and (III) instructing each of pooling layers corresponding to each of said pieces of matching information for testing to generate each of feature vectors for testing by pooling each region in the specific feature map for testing corresponding to said each of the ROI proposals for testing for each of said pieces of matching information for testing, and instructing each of FC layers corresponding to said each of the pooling layers to generate object regression information for testing and object class information for testing corresponding to said each of the ROI proposals for testing for each of said pieces of matching information for testing by referring to said each of the feature vectors for testing.

26. The testing device of claim 25, wherein, before the process of (I), parameters of the RPN have been learned by backpropagating one or more second losses calculated by a second loss layer according to instruction of the learning device, and wherein the second losses have been acquired by referring to the ROI regression information for training, the matching information for training, and at least one second GT.

27. The testing device of claim 25, wherein, if the test image is determined as including first objects for testing and second objects for testing corresponding respectively to first matching information for testing and second matching information for testing among the matching information for testing,
  at the process of (II), the processor instructs the proposal layer to output first ROI proposals for testing and second ROI proposals for testing corresponding respectively to the first matching information for testing and the second matching information for testing, and
  at the process of (III), the processor (i) instructs a first pooling layer corresponding to the first matching information for testing to generate a first feature vector for testing by pooling regions, in the specific feature map for testing, corresponding to the first ROI proposals for testing, and instructs a first FC layer corresponding to the first pooling layer to output first object class information for testing and first object regression information for testing of the first objects for testing by using the first feature vector for testing, and (ii) instructs a second pooling layer corresponding to the second matching information for testing to generate a second feature vector for testing by pooling regions, in the specific feature map for testing, corresponding to the second ROI proposal for testing, and instructs a second FC layer corresponding to the second pooling layer to output second object class information for testing and second object regression information for testing of the second objects for testing by using the second feature vector for testing.

28. The testing device of claim 25, wherein the processor further performs a process of instructing its outputting layer to display object information corresponding to the objects for testing on the test image, by referring to the ROI proposals for testing for each piece of the matching information for testing outputted from the proposal layer, and the object regression information for testing and the object class information for testing outputted from said each of FC layers.

* * * * *